United States Patent
Moriyama

(10) Patent No.: US 7,102,725 B2
(45) Date of Patent: Sep. 5, 2006

(54) METHOD OF MANUFACTURING LIQUID CRYSTAL DISPLAY

(75) Inventor: Naomi Moriyama, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 0 days.

(21) Appl. No.: 10/991,378

(22) Filed: Nov. 19, 2004

(65) Prior Publication Data

US 2005/0099583 A1 May 12, 2005

Related U.S. Application Data

(63) Continuation of application No. PCT/JP04/03576, filed on Mar. 17, 2004.

(30) Foreign Application Priority Data

Mar. 28, 2003 (JP) .............................. 2003-092267

(51) Int. Cl.
*G02F 1/13* (2006.01)
(52) U.S. Cl. ..................... 349/187; 349/73; 349/106; 349/139
(58) Field of Classification Search .............. 349/40, 349/73, 123, 139, 106, 187
See application file for complete search history.

(56) References Cited

U.S. PATENT DOCUMENTS 6,441,876 B1 * 8/2002 Wada et al. ................ 349/111
2003/0223021 A1 * 12/2003 Kaneko et al. ............. 349/106

FOREIGN PATENT DOCUMENTS

JP 2002-49051 2/2002
JP 2002-49057 2/2002

* cited by examiner

*Primary Examiner*—Toan Ton
*Assistant Examiner*—Tai Duong
(74) *Attorney, Agent, or Firm*—Oblon, Spivak, McCLelland, Maier & Neustadt, P.C.

(57) ABSTRACT

A substrate includes a valid area and a invalid area located outside the valid area, the valid area providing an array substrate, and a colored layers is formed in the valid area and the invalid area. A conductive film is formed on the colored layers in the valid area for forming a plurality of pixel electrodes, and the conductive film is simultaneously is formed on the colored layer in the invalid area. The substrate with the conductive film formed thereon is divided along the periphery of the valid area, thereby cutting the array substrate.

4 Claims, 3 Drawing Sheets

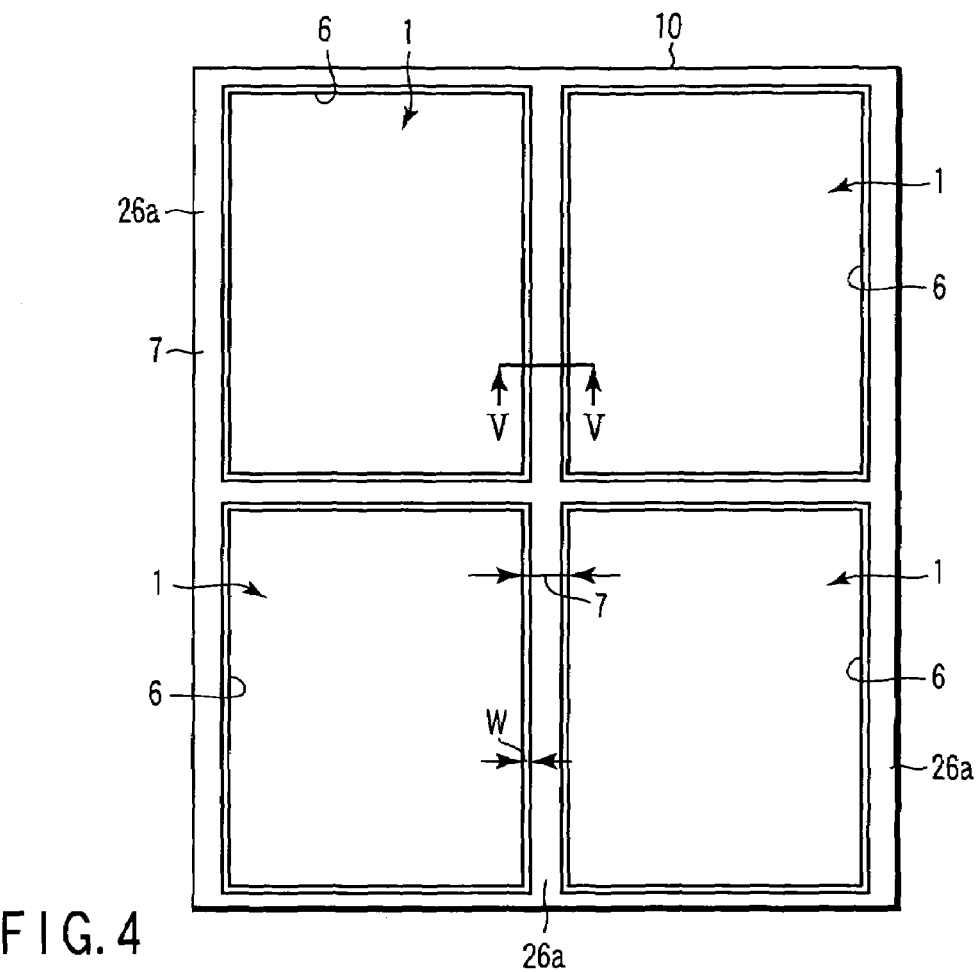
F I G. 4
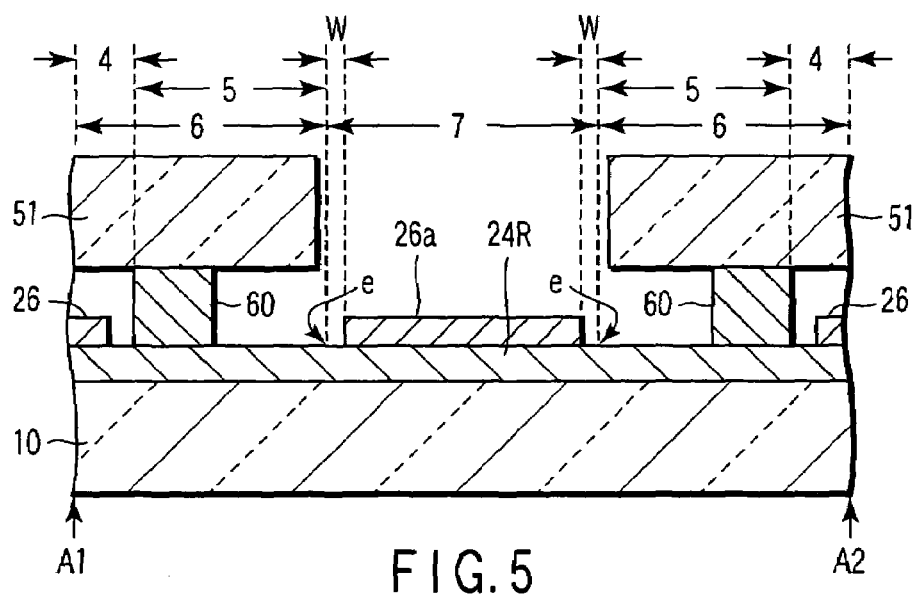
F I G. 5

METHOD OF MANUFACTURING LIQUID CRYSTAL DISPLAY

CROSS-REFERENCE TO RELATED APPLICATIONS

This is a Continuation Application of PCT Application No. PCT/JP2004/003576, filed Mar. 17, 2004, which was published under PCT Article 21(2) in Japanese.

This application is based upon and claims the benefit of priority from prior Japanese Patent Application No. 2003-092267, filed Mar. 28, 2003, the entire contents of which are incorporated herein by reference.

BACKGROUND OF THE INVENTION

1. Field of the Invention

The present invention relates to a method of manufacturing a liquid crystal display.

2. Description of the Related Art

In general, a liquid crystal display comprises an array substrate and counter substrate which are arranged opposite to each other with a predetermined gap, and a liquid crystal layer formed therebetween. A liquid crystal display, which displays color images, has a color filter with colored layers of red (R), green (G) and blue (B) arranged on the display area of either the array substrate or the counter substrate.

For example, in the field of direct-view-type active matrix liquid crystal displays, a liquid crystal display, in which a color filter is formed on its counter substrate for color display, has been developed. Further, a liquid crystal display, in which a color filter is formed on its array substrate for color display, has also been developed. When forming a color filter on the array substrate, no color filter is needed on the counter substrate, which enables pixels to have a high aperture ratio and enables the manufacturing cost to be reduced.

When manufacturing a liquid crystal display having a color filter provided on side the array substrate, firstly, a mother glass larger than the array substrate is prepared. After forming an array pattern and colored layers on the mother glass, an array substrate forming area of the mother glass and a counter substrate are bonded together. Subsequently, an array substrate is cut out of the mother glass, thereby forming an empty liquid crystal display. In this case, in order to manufacture the thickness of the liquid crystal display uniformly, the colored layers are formed to the outside portion of the array substrate forming area on the mother glass, as is disclosed in, for example, Jpn. Pat. Appln. KOKAI Publication No. 2002-49057. As a result, the whole mother glass has a uniform thickness.

In a manufacturing process of the array substrate constructed as above, the greater part of the colored layers that construct the array substrate is covered with pixel electrodes, therefore only a small portion of the colored layers is exposed. However, the small portion of the colored layers, which is formed on the area outside the array substrate forming area and exposed with no pixel electrodes thereon, may well peel off in a manufacturing process, in particular, a rinsing process using a brush. If the peeled portion sticks as dust to the array substrate, it serves as a factor that reduces the yield of products.

The present invention has been developed in light of the above, and aims to provide a method of manufacturing liquid crystal displays with a high manufacturing yield, while suppressing occurrence of undesirable substances due to peeling of colored layers.

BRIEF SUMMARY OF THE INVENTION

To satisfy the aim, there is provided a method of manufacturing a liquid crystal display that comprises an array substrate with colored layers, and a counter substrate which is arranged opposite to the array substrate with a predetermined gap therebetween, the method comprising: preparing a substrate which includes a valid area and an invalid area located outside the valid area, the valid area making the array substrate; forming a colored layer in the valid area and the invalid area; forming a conductive film on the colored layer in the valid area for forming a plurality of pixel electrodes, and simultaneously forming the conductive film on the colored layer in the invalid area; and dividing the substrate with the conductive film thereon along a periphery of the valid area, and cutting the array substrate.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a plan view illustrating a state, in which four array substrates are formed on a mother glass, in a liquid crystal display manufacturing method; and FIG. 5 is a sectional view taken along the line V—V in FIG. 4.

DETAILED DESCRIPTION OF THE INVENTION

A method of manufacturing a liquid crystal display, according to an embodiment of the invention, will be described in detail with reference to the accompanying drawings. Firstly, a description will be given of the structure of a liquid crystal display produced by the manufacturing method.

Figure 1:
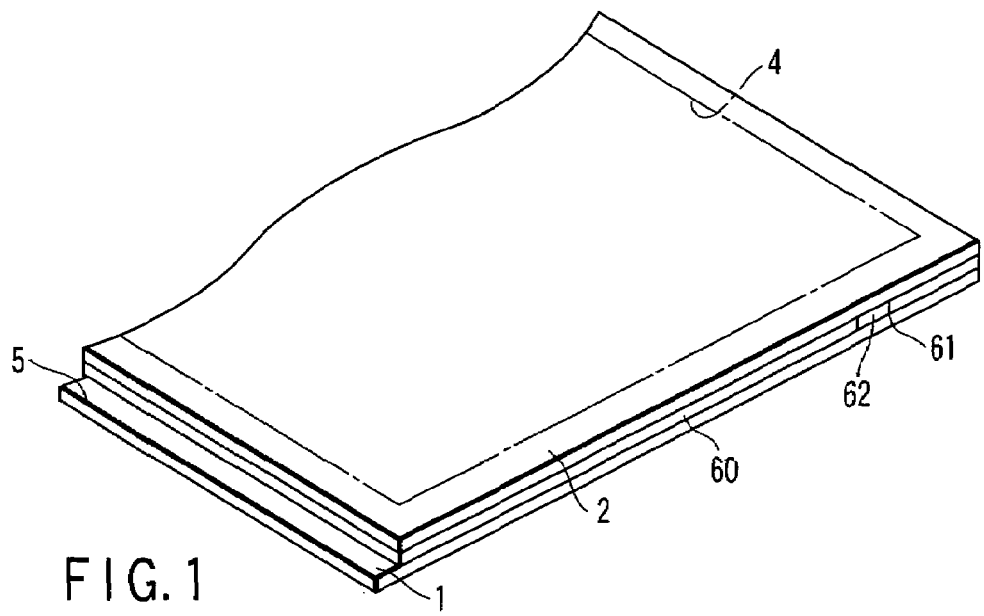
FIG. 1 is a perspective view of a liquid crystal display according to an embodiment of the invention.
Figure 2:
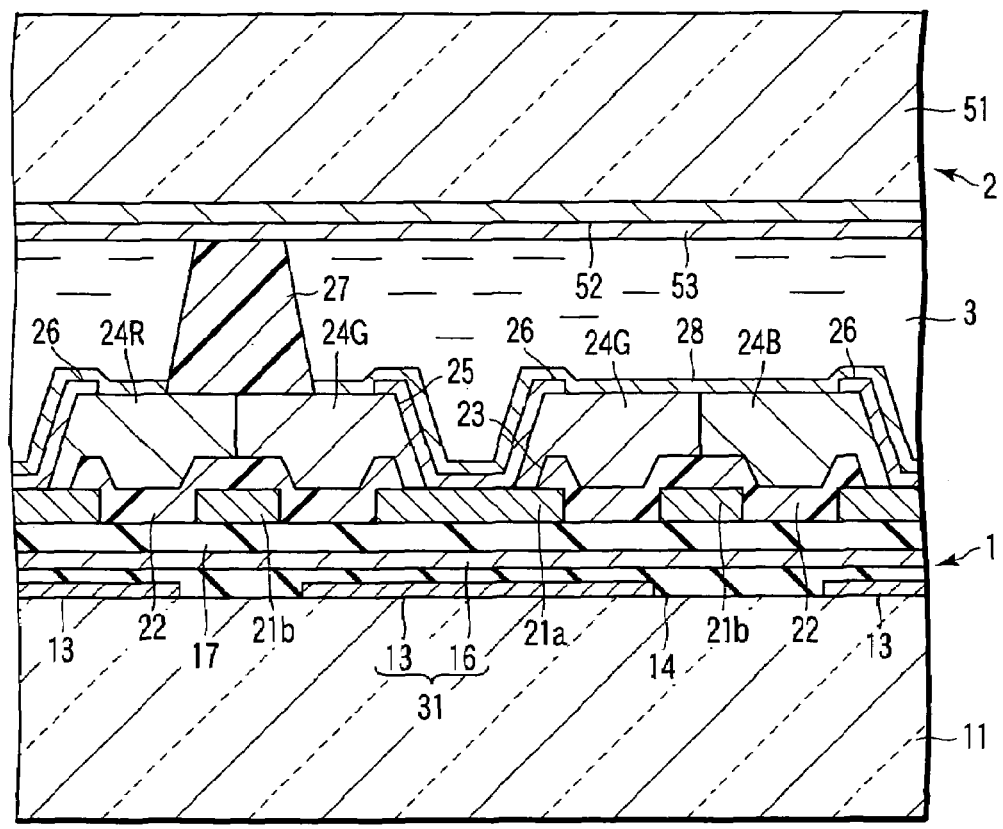
FIG. 2 is an enlarged sectional view illustrating part of the liquid crystal display of FIG. 1.
Figure 3:
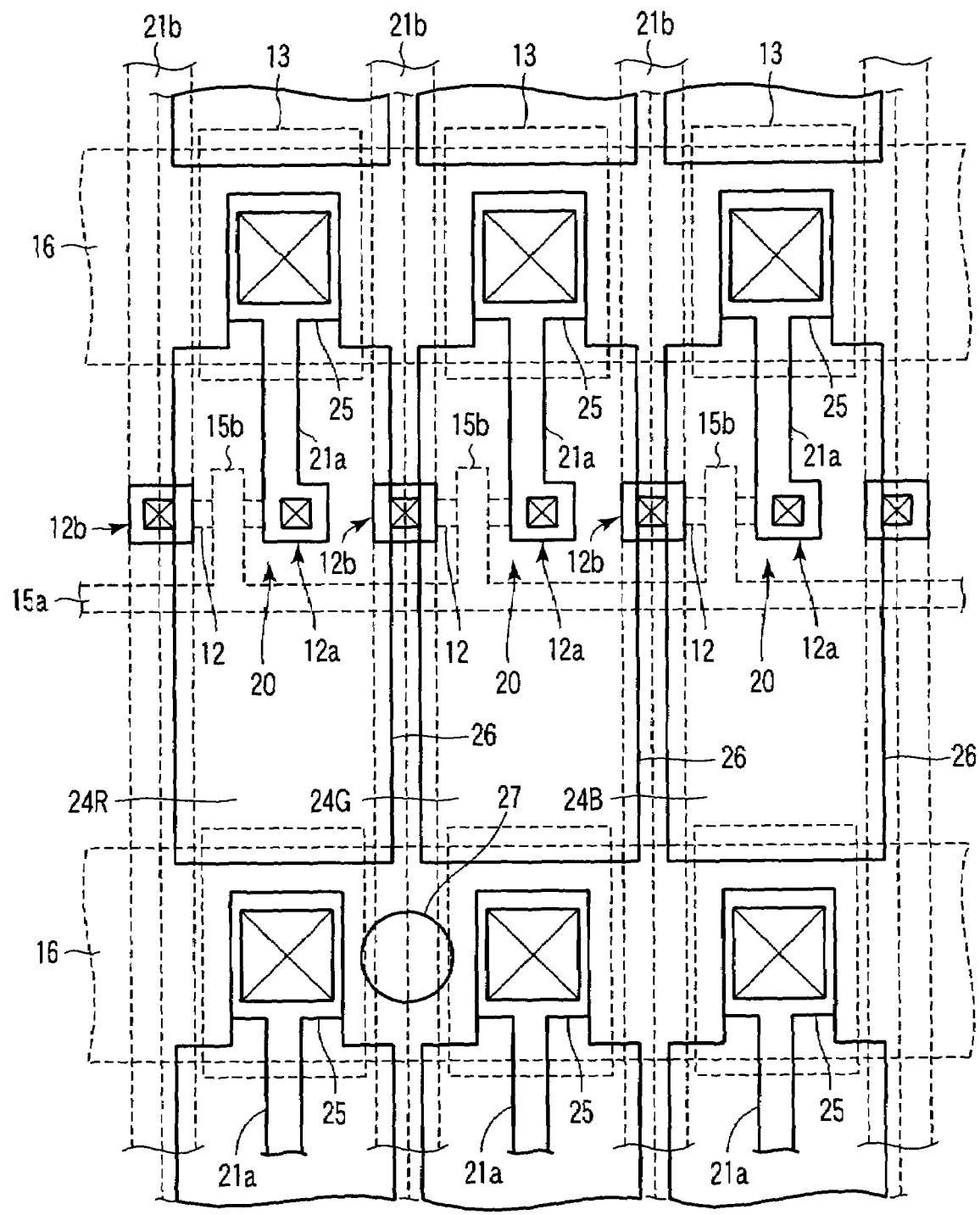
FIG. 3 is an enlarged plan view illustrating part of an array substrate in the liquid crystal display of FIG. 1.

As shown in FIGS. 1 to 3, the liquid crystal display comprises an array substrate 1, a counter substrate 2 which is arranged opposite to the array substrate with a predetermined gap therebetween, and a liquid crystal layer 3 held between the substrates.

The array substrate 1 includes a rectangular display area 4 as the central part, and a frame-shaped non-display area 5 extending along the periphery of the display area. The array substrate 1 has a glass substrate 11 as a transparent substrate. A plurality of signal lines 21b and scanning lines 15a are arranged in a matrix on the glass substrate 11. A TFT (hereinafter referred to as "the n-ch TFT") 20 of, for example, an n-channel LDD (Lightly Doped Drain) structure, which serves as a switching element, is provided at each intersection of the signal and scanning lines.

Each n-ch TFT 20 is formed of a semiconductor film, such as amorphous silicon (a-Si) or polysilicon (p-Si), and includes a channel layer 12 having source/drain regions 12a and 12b, and a gate electrode 15b formed by extending part of the corresponding scanning line 15a. In the embodiment, the channel layers 12 and auxiliary capacitance lower electrodes 13, described later, are formed of p-Si. Further, a plurality of auxiliary capacitor lines 16 incorporated in auxiliary capacitor elements 31 are formed on the glass substrate 11, extending parallel to the scanning lines 15a.

More specifically, in the display area 4, the channel layers 12 and auxiliary capacitance lower electrodes 13 are formed on the glass substrate 11, and a gate insulation film 14 is formed on the glass substrate that includes the channel layers and auxiliary capacitor lower electrodes. The scanning lines 15a, gate electrodes 15b and auxiliary capacitor lines 16 are provided on the gate insulation film 14. The auxiliary capacitor lines 16 oppose the auxiliary capacitance lower electrodes 13 with the gate insulation film 14 interposed therebetween. An interlayer insulation film 17 is formed on the gate insulation film 14 that includes the scanning lines 15a, gate electrodes 15b and auxiliary capacitor lines 16.

Contact electrodes 21a and signal liens 21b are formed on the interlayer insulation film 17. The contact electrodes 21a are connected to the respective source/drain regions 12a of the channel layers 12 and respective pixel electrodes 26 (described later) via respective contact holes. The signal lines 21b are connected to the respective source/drain regions 12b of the channel layers 12 via respective contact holes.

A protective insulation film 22 is formed on the contact electrodes 21a, signal lines 21b and interlayer insulation film 17. Further, on the protective insulation film 22, stripe green-colored layers 24G, red-colored layers 24R and blue-colored layers 24B are alternately arranged adjacent to each other. The colored layers 24G, 24R and 24B provide a color filter.

Respective pixel electrodes 26 formed of transparent conductive films, which are made of, for example, ITO (indium tin oxide), are formed on the colored layers 24G, 24R and 24B. The pixel electrodes 26 are connected to the respective contact electrodes 21a via respective contact holes 25 formed in the respective colored layers and the protective insulation film 22. The peripheral portions of the pixel electrodes 26 are overlapped and located the auxiliary capacitor lines 16 and signal liens 21b. The auxiliary capacitor lines 16 and signal liens 21b have as a black matrix (BM) having a light-shading function. The pixel electrodes 26 are connected electrically in parallel with the respective auxiliary capacitance lower electrodes 13.

As shown, a columnar spacer 27 is formed on the colored layers 24R and 24G. Although all are not illustrated, columnar spacers 27 are formed by desired density on the colored layers. An alignment film 28 is formed on the colored layers 24G, 24R and 24B and pixel electrodes 26.

On the other hand, in the non-display area 5, a liquid crystal driving circuit, not shown, which has Tufts of an n-channel LDD structure (hereinafter referred to as "the circuit n-ch Tufts") and p-channel Tufts (hereinafter referred to as "the circuit p-ch Tufts") is provided on the glass substrate 11. The area provided with the liquid crystal driving circuit also includes various lines etc., for operating the liquid crystal driving circuit. The colored layer 24R is provided on the overall uppermost surface of the array substrate 1 in the non-display area 5, except for, for example, the wires extended from the liquid crystal driving circuit. The plurality of columnar spacers 27 are formed on the colored layer 24R in the non-display area 5, as in the display area 4.

The counter substrate 2 has an insulative, transparent substrate 11 formed of, for example, glass. A counter electrode 52 formed of a transparent conductive material, such as ITO, and an orientation film 53 are formed in this order on the transparent substrate 51.

The array substrate 1 and counter substrate 2 which are held by the plurality of columnar spacers 27 such that they arranged opposite to each other with a predetermined gap therebetween, and are attached to each other by a sealing member 60 arranged on the peripheral portions of the substrates. A liquid crystal layer 3 is held between the array substrate 1 and counter substrate 2. A liquid crystal injection port 61 is formed in a portion of the sealing member 60, and is sealed by a sealant 62. The outer surfaces of the array substrate 1 and counter substrate 2 are arranged with respective polarizing plates (not shown).

A more detail description will now be given of the structure of the above liquid crystal display, as well as its manufacturing method.

Firstly, a substrate 10 (hereinafter referred to as "the mother glass") is prepared, which is larger than the array substrate 1 and is formed of a high-distortion-point glass substrate or quartz substrate serving as a transparent insulated substrate. As seen from FIG. 4, in the embodiment, the mother glass 10 has four valid areas 6 for forming respective array substrates 1, and an invalid area 7 around the valid areas. Each valid area 6 includes the display area 4 and non-display area 5. Although the four array substrates 1 are simultaneously formed, a description will be given of their manufacturing method using only one of the substrates as a representative.

As shown in FIGS. 2 and 3, an a-Si film is adhered on the prepared mother glass 10 by CVD (chemical vapor deposition) etc., and then furnace annealing is performed. Subsequently, an XeCl excimer laser beam is irradiated to the a-Si film, thereby converting it into a polycrystalline silicon (p-Si) film. The p-Si film is patterned by photo-etching, thereby forming a p-Si film pattern for n-ch Tufts 20, and the auxiliary capacitance lower electrodes 13. At the same time as this patterning, in the liquid crystal driving circuit area, the p-Si film pattern for the circuit n-ch TFT and the p-Si film pattern for the circuit p-ch TFT are formed. After that, an SiOx film serving as the gate insulation film 14 is adhered on the entire mother glass 10 by CVD.

Subsequently, a single film, laminated film or alloy film, which is made of a material or materials selected from Ta, Cr, Al, Mo, W, Cu, etc., is adhered on the entire gate insulation film 14, and patterned into a predetermined configuration by photo-etching, thereby forming the scanning lines 15a, gate electrodes 15b and auxiliary capacitor lines 16. At the same time as this forming, in the liquid crystal driving circuit area, various lines are formed, which include the scanning lines for the circuit n-ch Tufts and circuit p-ch Tufts, and gate electrodes formed of extended portions of the scanning lines.

After that, ion implantation or ion doping is performed, whereby an impurity is implanted into the p-Si film patterns for the n-ch Tufts 20 and the circuit n-ch Tufts, using a resist as a mask. As a result, the channel layers 12, including the source/drain regions 12a and 12b, of the n-ch Tufts 20, and the channel layers, including the source/drain regions, of the circuit n-ch Tufts are formed.

Subsequently, the channel layers 12 and the channel layers of the circuit n-ch Tufts are coated with a resist to prevent an impurity from being implanted, and then boron of a high concentration is implanted, using the gate electrodes of the circuit p-ch Tufts as masks. As a result, the channel layers, having source/drain regions, of the circuit p-ch Tufts are formed. Thereafter, an impurity of a low concentration is implanted to form the n-ch Tufts with an LDD structure, not shown. After the impurity implantation, the mother glass 10 is annealed to activate the impurity.

Subsequently, plasma CVD (PE-CVD) is performed to coat the entire mother glass 10 with the interlayer insulation film 17, and then contact holes reaching the source/drain regions 12a and 12b of the channel layers 12, and contact holes reaching the source/drain regions of the channel layers in the liquid crystal driving circuit area are formed by photo-etching. At the same time as this step, contact holes reaching the auxiliary capacitor lines 16, and contact holes reaching the gate electrodes in the liquid crystal driving circuit area are formed.

After that, a single film, laminated film or alloy film, which is made of a material or materials selected from Ta, Cr, Al, Mo, W, Cu, etc., is formed on the interlayer insulation film 17, and patterned into a predetermined configuration by photo-etching. As a result, the signal lines 21b connected to the source/drain regions 12b of the channel layers 12, the contact electrodes 21a connected to the source/drain regions 12a and pixel electrodes 26, and various lines in the liquid crystal driving circuit area are formed. Thereafter, the protective insulation film 22 made of, for example, SiNx is deposited on the entire mother glass 10 by PE-CVD, and then contact holes 23 reaching the contact electrodes 21a are formed by photo-etching.

Subsequently, the mother glass 10 is coated with an ultraviolet-cure-type acryl-based resin liquid of green using a spinner. After that, the mother glass 10 with the green resist is pre-baked and then exposed to light using a predetermined photomask. As a result, the part of the green resist liquid, which should remain, is hardened. The photomask used for exposure has a stripe pattern and a contact hole pattern for forming the contact holes 25 that reach the contact electrodes 21a.

Thereafter, the green resist is developed by a developer to eliminate unnecessary portions. Then, the developed green resist is formed, by post-baking, into the green colored layers 24G with the contact holes 25. The same process as that performed to form the colored layers 24G is repeated to sequentially form the red colored layers 24R and blue colored layers 24B in the display area 4. As shown in FIG. 5, when forming the colored layers 24R, this layer is also formed on the non-display area 5 and the invalid area 7 of the mother glass 10.

After forming each colored layers, ITO is deposited on the entire mother glass 10 by, for example, sputtering, thereby forming a conductive film, as is shown in FIGS. 4 and 5. The conductive film is then patterned into the pixel electrodes 26 on each colored layers in the display area 4. At this time, a conductive film 26a as a dummy pattern is left on the colored layer 24R in the invalid area 7, i.e., the colored layer is coated with this conductive film. The pixel electrodes 26 formed in the display area 4 are connected to the respective contact electrodes 21a via the respective contact holes 25.

In each valid area 6, the conductive film is not formed except for the non-display area 5. This is because if the conductive film is formed on this area, it may well short-circuit the wires etc., for example, extended from the liquid crystal driving circuit to the colored layer 24R of the non-display area 5. Further, in the invalid area 7, the conductive film 26a is formed on the colored layer 24R separately from the periphery e of each valid area 6 by a predetermined width w. Thereafter, the entire surface of the mother glass 10 including the valid areas 6 and invalid area 7 is rinsed using a brush.

After that, in the valid areas 6 and invalid area 7, a plurality of columnar spacers 27 made of, for example, a resin is formed on the colored layers 24G, 24R, 24B. Subsequently, the entire surface of the mother glass 10 is coated with an alignment film material, such as polyimide, and then patterned into the alignment film 28 formed on the entire display area 4. After that, the alignment film 28 is subjected to an orientation process (rubbing), thereby completing the array substrate 1 having color filters. Four array substrates are formed on the mother glass 10 by performing the above process in each valid area 6.

On the other hand, a transparent substrate 51 is used for the counter substrate 2. ITO is deposited on the transparent substrate 51 by sputtering, thereby forming the counter electrode 52. Subsequently, the entire surface of the transparent substrate 51 is coated with an alignment film material, such as polyimide, patterned and subjected to an orientation process, whereby the alignment film 53 is formed on the counter electrode 52. Thus, the counter substrate 2 is completed.

After that, as shown in FIGS. 1, 2 and 5, the periphery of the counter substrate 2 is coated with the sealing member 60, and then the counter substrate 2 is arranged opposite to the valid areas 6 of the mother glass 10. The mother glass 10 and counter substrate 2 are attached to each other using the sealing member. Subsequently, the mother glass 10 is divided along the peripheries e of the valid areas 6. Specifically, scribe lines are firstly formed along the peripheries e of the valid areas 6, and then the mother glass 10 is divided along the scribe lines. As a result, four array substrates 1 are cut out of the mother glass 10, obtaining empty liquid crystal displays.

Thereafter, nematic liquid crystal doped with a chiral material is injected, using vacuum injection, through the liquid crystal injection port 61 formed in part of the sealing member of the empty liquid crystal display. The liquid crystal injection port 61 is then sealed by the sealant 62 such as an ultraviolet cure type resin. As a result, liquid crystal is enclosed between the array substrate 1 and counter substrate 2, thereby forming the liquid crystal layer 3. After that, respective polarization plates (not shown) are arranged on the array substrate 1 and counter substrate 2, which is the completion of the liquid crystal display.

In the above-described method of manufacturing a liquid crystal display, when respective conductive films are formed on the colored layers in the valid areas 6, the conductive film 26a is also formed on the colored layer 24R in the invalid area 7 to cover it. This prevents peeling of the colored layer 24R in the invalid area 7, as well as peeling of the colored layers in the valid areas 6, when, for example, the mother glass 10 is rinsed using a brush in the process of manufacturing the array substrate 1 after forming the conductive film. Accordingly, it is possible to obtain liquid crystal displays which prevents occurrence of dust due to peeling of the colored layer 24R and realizes high-yield production.

Further, the conductive film 26a in the invalid area 7 is formed outside the peripheries e of the valid areas 6 by the width w. Accordingly, scribe lines can be directly formed on the mother glass 10 without the conductive film 26a interposed therebetween. This means that the mother glass 10 can be easily divided. In addition, the conductive film 26a is formed as the same time as the formation of the conductive film (serving as pixel electrodes 26) in the display area 4, and therefore can be easily formed without increasing the number of the manufacturing steps.

The invention is not limited to the above-described embodiment, but may be modified in various ways without departing from the scope. For instance, the number of array substrates 1 formed in a single mother glass 10 is not limited to four, but may be set to three or less, or five or more. The colored layer formed on the non-display area 5 and invalid area 7 is not limited to the colored layer 24R, but the colored layer 24G or 24B may be formed. Although in the above-described embodiment, scribe lines are formed to divide the mother glass 10, any other method may be employed if it enables the mother glass to be divided in good conditions.

The present invention can provide a method of manufacturing liquid crystal display apparatuses with a high manufacturing yield, while suppressing occurrence of undesirable substances due to peeling of colored layers.

What is claimed is:

1. A method of manufacturing a liquid crystal display that comprises an array substrate with colored layers, and a counter substrate which is arranged opposite to the array substrate with a predetermined gap therebetween, the method comprising:

preparing a substrate which includes a valid area and an invalid area located outside the valid area, the valid area making the array substrate;

forming colored layers in the valid area and the invalid area;

forming a conductive film on the colored layers in the valid area for forming a plurality of pixel electrodes, and simultaneously forming the conductive film on the colored layer in the invalid area;

attaching the counter substrate to the array substrate;

drawing a scribe line on the substrate along a periphery of the valid area without the conductive film interposed therebetween; and dividing the substrate along the scribe line.

2. The method according to claim 1, further comprising:

forming an alignment film in the valid area after the substrate with the conductive film formed is rinsed.

3. The method according to claim 2, further comprising:

attaching the counter substrate to the valid area after a rubbing of the alignment film in a predetermined direction.

4. The method according to claim 1, wherein when forming the conductive film on the colored layer in the invalid area, the conductive film is formed at a predetermined distance from the periphery of the valid area.

* * * * *